United States Patent
Talpade et al.

(10) Patent No.: US 11,822,216 B2
(45) Date of Patent: Nov. 21, 2023

(54) METHODS, SYSTEMS, APPARATUS, AND ARTICLES OF MANUFACTURE FOR DOCUMENT SCANNING

(71) Applicant: Nielsen Consumer LLC, New York, NY (US)

(72) Inventors: Mahesh Talpade, Tampa, FL (US); Sumit Rastogi, Bangalore (IN); Sricharan Amarnath, Chennai (IN)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 17/345,940

(22) Filed: Jun. 11, 2021

(65) Prior Publication Data

US 2022/0397809 A1 Dec. 15, 2022

(51) Int. Cl.
*G03B 17/56* (2021.01)
*H04N 1/195* (2006.01)
*H04N 5/262* (2006.01)
*H04N 23/60* (2023.01)
*H04N 23/80* (2023.01)

(52) U.S. Cl.
CPC ....... *G03B 17/561* (2013.01); *H04N 1/19594* (2013.01); *H04N 5/2624* (2013.01); *H04N 23/64* (2023.01); *H04N 23/80* (2023.01)

(58) Field of Classification Search
CPC ............... G03B 17/561; G03B 27/323; H04N 1/19594; H04N 1/00562; H04N 1/00127; H04N 2201/0422; F16M 11/00; F16M 13/00; F16M 13/02
See application file for complete search history.

(56) References Cited

U.S. PATENT DOCUMENTS

| | | | |
|---|---|---|---|
| 5,410,611 | A | 4/1995 | Huttenlocher et al. |
| 5,606,690 | A | 2/1997 | Hunter et al. |
| 7,454,063 | B1 | 11/2008 | Kneisl et al. |
| 7,792,709 | B1 | 9/2010 | Trandal et al. |
| 8,787,695 | B2 | 7/2014 | Wu et al. |
| 8,983,170 | B2 | 3/2015 | Nepomniachtchi et al. |
| 9,014,432 | B2 | 4/2015 | Fan et al. |

(Continued)

FOREIGN PATENT DOCUMENTS

| | | |
|---|---|---|
| CN | 103123685 | 5/2013 |
| CN | 104866849 | 8/2015 |

(Continued)

OTHER PUBLICATIONS

Google, "Detect Text in Images," Mar. 29, 2021, 20 pages. Retrieved from http://cloud.google.com/vision/docs/ocr.

(Continued)

*Primary Examiner* — Christopher E Mahoney
(74) *Attorney, Agent, or Firm* — HANLEY, FLIGHT & ZIMMERMAN, LLC

(57) ABSTRACT

Methods, systems, apparatus, and articles of manufacture for document scanning are disclosed. An example apparatus includes a base structured to position a mobile device, the base including an opening corresponding to a camera of the mobile device, and at least two side panels couplable to and foldable toward the base, the side panels to maintain a first distance between the base and a target document, the side panels slidable along the target document.

20 Claims, 7 Drawing Sheets

(56) References Cited

U.S. PATENT DOCUMENTS

| | | | |
|---|---|---|---|
| 9,158,744 | B2 | 10/2015 | Rao et al. |
| 9,239,952 | B2 | 1/2016 | Hsu et al. |
| 9,290,022 | B2 | 3/2016 | Makabe |
| 9,298,979 | B2 | 3/2016 | Nepomniachtchi et al. |
| 9,323,135 | B1* | 4/2016 | Veloso .................. F16M 13/00 |
| 9,324,073 | B2 | 4/2016 | Nepomniachtchi et al. |
| 9,384,389 | B1 | 7/2016 | Sankaranarayanan et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 10,032,072 | B1 | 7/2018 | Tran et al. |
| 10,157,425 | B2 | 12/2018 | Chelst et al. |
| 10,235,585 | B2 | 3/2019 | Deng |
| 10,395,772 | B1 | 8/2019 | Lucas |
| 11,321,956 | B1 | 5/2022 | Geng |
| 11,410,446 | B2 | 8/2022 | Shanmuganathan et al. |
| 11,625,930 | B2 | 4/2023 | Rodriguez |
| 2002/0037097 | A1 | 3/2002 | Hoyos et al. |
| 2003/0185448 | A1 | 10/2003 | Seeger |
| 2006/0232619 | A1 | 10/2006 | Otsuka et al. |
| 2007/0041642 | A1 | 2/2007 | Romanoff et al. |
| 2010/0306080 | A1 | 12/2010 | Trandal et al. |
| 2011/0122443 | A1 | 5/2011 | Otsuka et al. |
| 2011/0243445 | A1 | 10/2011 | Uzelac |
| 2011/0289395 | A1 | 11/2011 | Breuel et al. |
| 2011/0311145 | A1 | 12/2011 | Bern et al. |
| 2012/0183211 | A1 | 7/2012 | Hsu et al. |
| 2012/0274953 | A1 | 11/2012 | Makabe |
| 2012/0330971 | A1 | 12/2012 | Thomas et al. |
| 2013/0058575 | A1 | 3/2013 | Koo et al. |
| 2013/0170741 | A9 | 7/2013 | Hsu et al. |
| 2014/0002868 | A1* | 1/2014 | Landa ................ H04N 1/00562 358/473 |
| 2014/0064618 | A1 | 3/2014 | Janssen, Jr. |
| 2014/0195891 | A1 | 7/2014 | Venkata Radha Krishna Rao et al. |
| 2015/0169951 | A1 | 6/2015 | Khintsitskiy et al. |
| 2015/0254778 | A1 | 9/2015 | Kmak et al. |
| 2016/0125383 | A1 | 5/2016 | Chan et al. |
| 2016/0203625 | A1 | 7/2016 | Khan et al. |
| 2016/0210507 | A1 | 7/2016 | Abdollahian |
| 2016/0234431 | A1 | 8/2016 | Kraft |
| 2016/0307059 | A1 | 10/2016 | Chaudhury |
| 2016/0342863 | A1 | 11/2016 | Kwon et al. |
| 2017/0293819 | A1 | 10/2017 | Deng |
| 2018/0005345 | A1 | 1/2018 | Apodaca et al. |
| 2018/0060302 | A1 | 3/2018 | Liang et al. |
| 2019/0050639 | A1 | 2/2019 | Ast |
| 2019/0171900 | A1 | 6/2019 | Thrasher et al. |
| 2019/0325211 | A1 | 10/2019 | Ordonez et al. |
| 2019/0332662 | A1 | 10/2019 | Middendorf et al. |
| 2019/0354818 | A1 | 11/2019 | Reisswig et al. |
| 2020/0097718 | A1 | 3/2020 | Schafer |
| 2020/0142856 | A1 | 5/2020 | Neelamana |
| 2020/0151444 | A1 | 5/2020 | Price et al. |
| 2020/0175267 | A1 | 6/2020 | Schafer et al. |
| 2020/0249803 | A1 | 8/2020 | Sobel |
| 2020/0401798 | A1 | 12/2020 | Foncubierta Rodriguez |
| 2020/0410231 | A1 | 12/2020 | Chua et al. |
| 2021/0019287 | A1 | 1/2021 | Prasad |
| 2021/0034856 | A1 | 2/2021 | Torres et al. |
| 2021/0090694 | A1 | 3/2021 | Colley |
| 2021/0117665 | A1 | 4/2021 | Simantov et al. |
| 2021/0117668 | A1 | 4/2021 | Zhong |
| 2021/0149926 | A1 | 5/2021 | Komninos et al. |
| 2021/0158038 | A1 | 5/2021 | Shanmuganathan et al. |
| 2021/0248420 | A1 | 8/2021 | Zhong |
| 2021/0295101 | A1 | 9/2021 | Tang et al. |
| 2021/0319217 | A1 | 10/2021 | Wang |
| 2021/0343030 | A1 | 11/2021 | Sagonas |
| 2021/0406533 | A1 | 12/2021 | Arroyo et al. |
| 2022/0114821 | A1 | 4/2022 | Arroyo et al. |
| 2022/0189190 | A1 | 6/2022 | Arroyo et al. |
| 2022/0383651 | A1 | 12/2022 | Shanmuganathan et al. |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |
| 2023/0008198 | A1 | 1/2023 | Gadde |
| 2023/0196806 | A1 | 6/2023 | Ramalingam |
| 2023/0214899 | A1 | 7/2023 | Cebrián |

FOREIGN PATENT DOCUMENTS

| | | | | |
|---|---|---|---|---|
| CN | 108229397 | | 6/2018 | |
| CN | 109389124 | A | 2/2019 | |
| CN | 112446351 | A | 3/2021 | |
| CN | 112560862 | A | 3/2021 | |
| DE | 202013005144 | U1 * | 12/2013 | ........... F16M 11/046 |
| JP | 07049529 | A * | 2/1995 | |
| JP | 2008211850 | A * | 9/2008 | |
| JP | 2019139737 | A | 8/2019 | |
| KR | 10-1831204 | | 2/2018 | |
| WO | WO-2013044145 | A1 * | 3/2013 | ......... H04N 1/00535 |
| WO | 2020194004 | A1 | 10/2020 | |
| WO | WO-2022123199 | A1 * | 6/2022 | |

OTHER PUBLICATIONS

Qasim et al., "Rethinking Table Recognition using Graph Neural Networks," in International Conference on Document Analysis and Recognition (ICDAR), Jul. 3, 2019, 6 pages.

Nshuti, "Mobile Scanner and OCR (a First Step Towards Receipt to Spreadsheet)," 2015, 3 pages.

O'Gorman et al., "Document Image Analysis," IEEE Computer Society Executive Briefings, 2009, 125 pages.

International Searching Authority, "Search Report and Written Opinion," issued in connection with Application No. PCT/US2021/039931, dated Nov. 4, 2021, 7 pages.

Genereux et al., "NLP Challenges in Dealing with OCR-ed Documents of Derogated Quality," Workshop on Replicability and Reproducibility in Natural Language Processing: adaptive methods, resources and software at IJCAI 2015, Jul. 2015, 6 pages.

Govindan et al., "Character Recognition—a Review," Pattern Recognition, vol. 23, No. 7, pp. 671-683, 1990, 13 pages.

Lecun et al., "Deep Learning," Nature, vol. 521, pp. 436-444, May 28, 2015, 9 pages.

Kim et al., "Character-Aware Neural Language Models," Proceedings of the Thirtieth AAAI Conference on Artificial Intelligence (AAAI'16), pp. 2741-2749, 2016, 9 pages.

Wikipedia, "Precision & Recall," Dec. 17, 2018 revision, 8 pages.

Hui, "mAP (mean Average Precision) for Object Detection," Mar. 6, 2018, 2 pages. Retrieved from [https://medium.com/@jonathan_hui/map-mean-average-precision-for-object-detection-45c121a31173] on May 11, 2020, 2 pages.

Artificial Intelligence & Image Analysis, "Historic Document Conversion," Industry Paper, accessed on Jan. 30, 2019, 4 pages.

Artificial Intelligence & Image Analysis, "Intelligent Automation Eliminates Manual Data Entry From Complex Documents," White Paper, accessed on Jan. 30, 2019, 3 pages.

Vogel et al., "Parallel Implementations of Word Alignment Tool," Software Engineering, Testing, and Quality Assurance for Natural Language Processing, pp. 49-57, Jun. 2008, 10 pages.

International Searching Authority, "International Search Report," mailed in connection with International Patent Application No. PCT/US2020/061269, dated Mar. 11, 2021, 3 pages.

International Searching Authority, "Written Opinion," mailed in connection with International Patent Application No. PCT/US2020/061269, dated Mar. 11, 2021, 4 pages.

United States Patent and Trademark Office, "Non-Final Office Action," issued in connection with U.S. Appl. No. 16/692,797, dated Mar. 16, 2021, 12 pages.

United States Patent and Trademark Office, "Final Office Action," issued in connection with U.S. Appl. No. 16/692,797, dated Oct. 27, 2021, 14 pages.

(56) References Cited

OTHER PUBLICATIONS

International Searching Authority, "International Search Report," mailed in connection with International Patent Application No. PCT/IB2019/000299, dated Dec. 23, 2019, 3 pages.
International Searching Authority, "Written Opinion," mailed in connection with International Patent Application No. PCT/IB2019/000299, dated Dec. 23, 2019, 4 pages.
Bartz et al., "STN-OCT: a Single Neural Network for Text Detection and Text Recognition," Computer Vision and Pattern Recognition, Jul. 27, 2017, 9 pages.
Ozhiganov, "Deep Dive Into OCR for Receipt Recognition," DZone, Jun. 21, 2017, 18 pages.
Akbik et al., "Contextual String Embeddings for Sequence Labeling," in Proceedings of the 27th International Conference on Computational Linguistics (COLING), 2018, 12 pages.
Bojanowski et al., "Enriching Word Vectors with Subword Information," in Journal Transactions of the Association for Computational Linguistics, 2017, vol. 5, pp. 135-146, 12 pages.
Devlin et al., "BERT: Pre-training of Deep Bidirectional Transformers for Language Understanding," in Conference of the North American Chapter of the Association for Computational Linguistics (NAACL-HLT), Jun. 24, 2019, 16 pages.
DeepDive, "Distant Supervision" 2021, 2 pages. [available online on Stanford University website, http://deepdive.stanford.edu/distant_supervision].
Joulin et al., "Bag of Tricks for Efficient Text Classification," in Proceedings of the 15th Conference of the European Chapter of the Association for Computational Linguistics, Aug. 9, 2016, 5 pages.
Krizhevsky et al., "ImageNet Classification with Deep Convolutional Neural Networks," in International Conference on Neural Information Processing Systems (NIPS), 2012, 9 pages.
Konda et al., "Magellan: Toward Building Entity Matching Management Systems Over Data Science Stacks," Proceedings of the VLDB Endowment, vol. 9, No. 13, pp. 1581-1584, 2016, 4 pages.
Levenshtein, "Binary Codes Capable of Correcting Deletions, Insertions, and Reversals," Soviet Physics-Doklady, Cybernetics and Control Theory, pp. 707-710, vol. 10, No. 8, Feb. 1966, 4 pages.
Mudgal et al., "Deep learning for entity matching: A design space exploration," in Proceedings of the 2018 International Conference on Management of Data, 2018, Houston, TX, 16 pages.
Redmon et al., "You Only Look Once: Unified, Real-Time Object Detection," in Conference on Computer Vision and Pattern Recognition (CVPR), 2016, 10 pages.
Ren et al., "Faster R-CNN: Towards Real-Time Object Detection with Region Proposal Networks," in International Conference on Neural Information Processing Systems (NIPS), pp. 91-99, 2015, 14 pages.
Smith et al., "Identification of Common Molecular Subsequences," Reprinted Journal of Molecular Biology, Academic Press Inc. (London) Ltd., pp. 195-197, 1981, 4 pages.
Github, "Tesseract OCR" Tesseract Repository on GitHub, 2020, 4 pages. [available online, https://github.com/tesseract-ocr/].
Vaswani et al., " Attention Is All You Need," 31st Conference on Neural Information Processing Systems (NIPS 2017), Long Beach, CA, 2017, 11 pages.
United States Patent and Trademark Office, " Advisory Action," issued in connection with U.S. Appl. No. 16/692,797, dated Feb. 16, 2022, 4 pages.
Oliveira et al., "dhSegment: a generic deep-learning approach for document segmentation," in 16th International Conference on Frontiers in Handwriting Recognition (ICFHR), 2019, 6 pages.
Ronneberger et al., "U-Net: Convolutional Networks for Biomedical Image Segmentation," Medical Image Computing and Computer-Assisted Intervention (MICCAI), 2015, 8 pages.
Lowe, "Distinctive Image Features from Scale-Invariant Keypoints," International Journal of Computer Vision (IJCV), Jan. 5, 2004, 28 pages.
Marinai, "Introduction to Document Analysis and Recognition," Machine Learning in Document Analysis and Recognition, 2008, 22 pages.

Zhong et al., "PubLayNet: largest dataset ever for document layout analysis," in International Conference on Document Analysis and Recognition (ICDAR), 2019, 8 pages.
Follmann et al., "MVTec D2S: Densely Segmented Supermarket Dataset". In European Conference on Computer Vision (ECCV), 2018, 17 pages.
Osindero et al., "Recursive Recurrent Nets with Attention Modeling for OCR in the Wild," in Conference on Computer Vision and Pattern Recognition (CVPR), 2016, 10 pages.
NielsenIQ Brandbank, "Nielsen Brandbank Product Library," Online Available. Retrieved on Apr. 1, 2022, 5 pages. [retrieved from: https://www.brandbank.com/us/product-library/].
Ray et al., "U-PC: Unsupervised Planogram Compliance," in European Conference on Computer Vision (ECCV), 2018, 15 pages. [retrieved from: http://openaccess.thecvf.com/content_ECCV_2018/papers/Archan_Ray_U-PC_Unsupervised_Planogram_ECCV_2018_paper.pdf].
Appalaraju et al., "DocFormer: End-to-End Transformer for Document Understanding," arXiv (CoRR), 2021, 22 pages. [retrieved from: https://arxiv.org/pdf/2106.11539.pdf].
Hong et al., "BROS: a Pre-trained Language Model Focusing on Text and Layout for Better Key Information Extraction from Documents," arXiv (CoRR), 2021, 13 pages. [retrieved from: https://arxiv.org/pdf/2108.04539.pdf].
Hwang et al., "Spatial Dependency Parsing for Semi-Structured Document Information Extraction," in International Joint Conference on Natural Language Processing (IJCNLP), 2021, 14 pages. [retrieved from: https://arxiv.org/pdf/2005.00642.pdf].
Shen et al., "LayoutParser: a Unified Toolkit for Deep Learning Based Document Image Analysis," in International Conference on Document Analysis and Recognition (ICDAR), 2021, 16 pages. [retrieved from: https://arxiv.org/pdf/2103.15348.pdf].
Wick et al., "Calamari—a High-Performance Tensorflow-based Deep Learning Package for Optical Character Recognition," Digital Humanities Quarterly, 2020, 12 pages. [retrieved from: https://arxiv.org/ftp/arxiv/papers/1807/1807.02004.pdf].
Yu et al., "PICK: Processing Key Information Extraction from Documents using Improved Graph Learning-Convolutional Networks," in International Conference on Pattern Recognition (ICPR), 2020, 8 pages. [retrieved from: https://arxiv.org/pdf/2004.07464.pdf].
Zacharias et al., "Image Processing Based Scene-Text Detection and Recognition with Tesseract," arXiv (CoRR), 2020, 6 pages. [retrieved from: https://arxiv.org/pdf/2004.08079.pdf].
International Searching Authority, "International Preliminary Report on Patentability" mailed in connection with International Patent Application No. PCT/IB2019/000299, dated Sep. 28, 2021, 5 pages.
Github, "Doccano tool," Github.com, downloaded on Apr. 1, 2022, 12 pages. [retrieved from: https://github.com/doccano/doccano].
Github, "FIAT tool—Fast Image Data Annotation Tool, " Github.com, downloaded on Apr. 1, 2022, 30 pages. [retrieved from: https://github.com/christopher5106/FastAnnotationTool].
Datasetlist, "Annotation tools for building datasets," Labeling tools—List of labeling tools, Datasetlist.com, updated Dec. 2021, downloaded on Apr. 1, 2022, 12 pages. [retrieved from: https://www.datasetlist.com/tools/].
Xu et al., "LayoutLM: Pre-training of Text and Layout for Document Image Understanding," in International Conference on Knowledge Discovery & Data Mining (SIGKDD), 2020, 9 pages. [retrieved from: https://arxiv.org/pdf/1912.13318.pdf].
United States Patent and Trademark Office, "Notice of Allowance and Fee(s) Due," issued in connection with U.S. Appl. No. 16/692,797, dated Apr. 5, 2022, 10 pages.
United States Patent and Trademark Office, "Corrected Notice of Allowability," issued in connection with U.S. Appl. No. 16/692,797, dated Apr. 22, 2022, 3 pages.
International Searching Authority, "International Preliminary Report on Patentability," mailed in connection with International Patent Application No. PCT/US2020/061269, dated May 17, 2022, 5 pages.
European Patent Office, "Communication pursuant to Rules 161(2) and 162 EPC," issued in connection with Application No. 20891012.5, dated Jun. 29, 2022, 3 pages.

(56) References Cited

OTHER PUBLICATIONS

United States Patent and Trademark Office, "Non-Final Office Action," issued in connection with U.S. Appl. No. 17/075,675, dated Sep. 22, 2022, 12 pages.

International Searching Authority, "International Search Report and Written Opinion," mailed in connection with International Patent Application No. PCT/US2022/034570, dated Oct. 20, 2022, 8 pages.

European Patent Office, "Extended Search Report," issued in connection with Application No. 19921870.2, dated Oct. 12, 2022, 11 pages.

European Patent Office, "Communication pursuant to Rules 70(2) and 70a(2) EPC," issued in connection with Application No. 19921870.2, dated Nov. 2, 2022, 1 page.

United States and Patent and Trademark Office, "Notice of Allowance and Fee(s) Due," issued in connection with U.S. Appl. No. 17/364,419, dated Nov. 4, 2022, 10 pages.

European Patent Office, "Extended Search Report," issued in connection with Application No. 22180113.7, dated Nov. 22, 2022, 7 pages.

Chen et al., "TextPolar: irregular scene text detection using polar representation," International Journal on Document Analysis and Recognition (IJDAR), 2021, published May 23, 2021, 9 pages.

United States and Patent and Trademark Office, "Corrected Notice of Allowability," issued in connection with U.S. Appl. No. 17/364,419, dated Nov. 15, 2022, 2 pages.

European Patent Office, "Communication pursuant to Rules 161(2) and 162 EPC," issued in connection with Application No. 19921870.2, dated Nov. 5, 2021, 3 page.

Canadian Patent Office, "Office Action," issued in connection with Application No. 3,124,868, dated Nov. 10, 2022, 4 pages.

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.

Feng et al., "Computer vision algorithms and hardware implementations: a survey", Integration: the VLSI Journal, vol. 69, pp. 309-320, https://www.sciencedirect.com/science/article/pii/S0167926019301762, accepted Jul. 27, 2019, 12 pages.

United States Patent and Trademark Office, "Non-Final Office Action," issued in connection with U.S. Appl. No. 17/379,280, dated Dec. 2, 2022, 14 pages.

Li et al., "Extracting Figures and Captions from Scientific Publications," Short Paper, CIKM18, Oct. 22-26, 2018, Torino, Italy, 4 pages.

European Patent Office, "Extended Search Report," issued in connection with Application No. 22184405.3, dated Dec. 2, 2022, 7 pages.

United States and Patent and Trademark Office, "Corrected Notice of Allowability," issued in connection with U.S. Appl. No. 17/364,419, dated Jan. 4, 2023, 2 pages.

International Searching Authority, "International Preliminary Report on Patentability," issued in connection with Application No. PCT/US2021/039931, dated Dec. 13, 2022, 6 pages.

United States and Patent and Trademark Office, "Non-Final Office Action," issued in connection with U.S. Appl. No. 17/883,309, dated Jan. 20, 2023, 14 pages.

United States and Patent and Trademark Office, "Corrected Notice of Allowability," issued in connection with U.S. Appl. No. 17/364,419, dated Feb. 15, 2023, 2 pages.

European Patent Office, "Communication Pursuant to Rule 69 EPC," dated Jan. 23, 2023 in connection with European Patent Application No. 22184405.3, 2 pages.

United Kingdom Patent Office, "Examinination Report under section 18(3)," issued in connection with GB Application No. 2112299.9, dated Feb. 17, 2023, 2 pages.

European Patent Office, "Communication pursuant to Rule 69 EPC," issued in connection with Application No. 22180113.7, dated Jan. 10, 2023, 2 pages.

United States Patent and Trademark Office, "Final Office Action," issued in connection with U.S. Appl. No. 17/075,675, dated Mar. 7, 2023, 11 pages.

United States Patent and Trademark Office, "Final Office Action," issued in connection with U.S. Appl. No. 17/379,280, dated May 5, 2023, 17 pages.

Crandall et al., "Extraction of special effects caption text events from digital video," IJDAR, Department of Computer Science and Engineering, The Pennsylvania State University, 202 Pond Laboratory, Universirty Park, PA, Accepted Sep. 13, 2022, pp. 138-157, 20 pages.

European Patent Center, "Extended European Search Report," issued in connection with Application No. 22214553.4, dated May 17, 2023, 9 pages.

Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.

United States and Patent and Trademark Office, "Notice of Allowance and Fee(s) Due," issued in connection with U.S. Appl. No. 17/883,309, dated May 11, 2023, 9 pages.

United States Patent and Trademark Office, "Notice of Allowance and Fee(s) Due," issued in connection with U.S. Appl. No. 17/075,675, dated Jun. 26, 2023, 8 pages.

United States Patent and Trademark Office, "Advisory Action," issued in connection with U.S. Appl. No. 17/075,675, dated May 30, 2023, 3 pages.

\* cited by examiner

METHODS, SYSTEMS, APPARATUS, AND ARTICLES OF MANUFACTURE FOR DOCUMENT SCANNING

FIELD OF THE DISCLOSURE

This disclosure relates generally to image processing, and, more particularly, to methods, systems, apparatus, and articles of manufacture for document scanning.

BACKGROUND

An image capturing device, such as a mobile device, can be used to capture images of a document. The document may be an invoice or a receipt associated with a purchase made by a consumer. In some cases, the images are provided to a computing device, and the computing device can process the images using various techniques to obtain retail, market, and/or consumer data.

Figure 1:
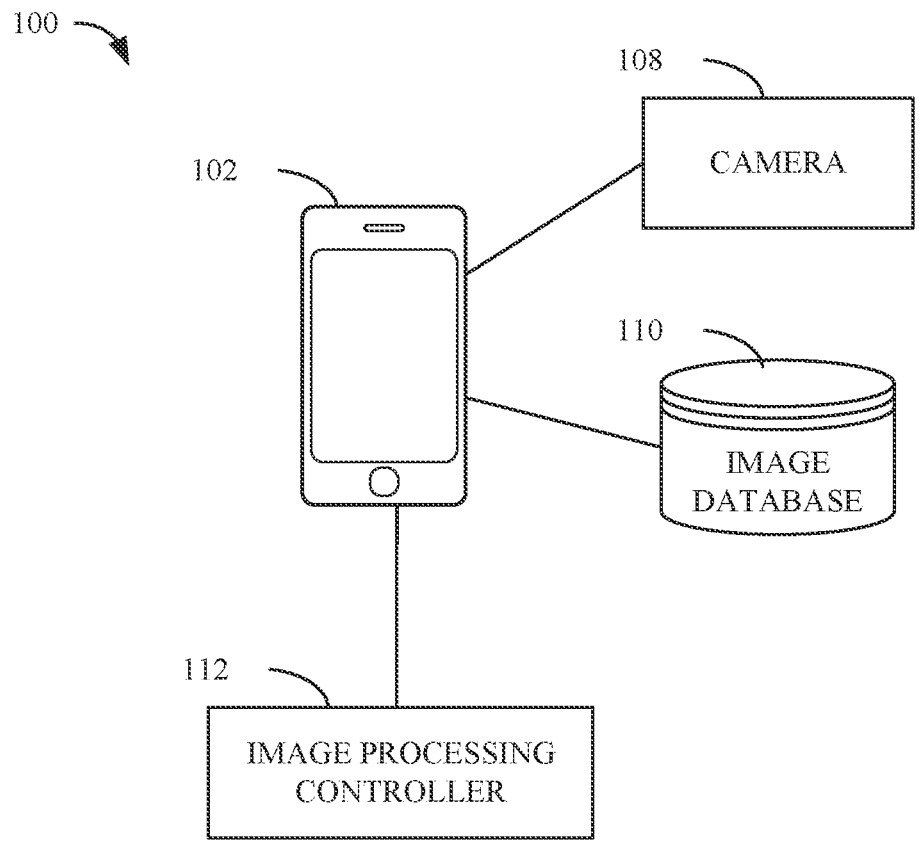
FIG. 1 illustrates an example environment for capturing and processing image data constructed in a manner consistent with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods, systems, apparatus, and articles of manufacture for document scanning are disclosed. To track consumer data, a measurement entity may receive image data from auditors and/or panelists. The image data may include captured images and/or videos of a document such as a receipt or an invoice. In some cases, the image data is captured using a mobile device (e.g., image capturing device), and the image data can be processed on the mobile device and/or sent to a server associated with the measurement entity. The measurement entity can process and/or analyze the image data to determine retail, market, and/or consumer information based on the document.

Commonly, a user of the mobile device manually captures an image using a camera of the mobile device. For example, the user holds the mobile device at a distance from the document, and points the camera towards the document to capture the image. Characteristics of the captured image are based on a position and/or orientation of the camera relative to the document. In some cases, incorrect positioning and/or orientation of the mobile device can cause misalignment of the image and/or can cause text in the image to appear warped, blurry, and/or otherwise unrecognizable. Furthermore, movement of the user's hand can cause the position and/or orientation of the camera to vary over time, thereby resulting in inconsistent image quality and/or images that are blurry and/or distorted. Such issues may prevent accurate processing of the image and/or reduce an ability to reliably obtain information from the image.

In some cases, a document may be relatively large and/or have an irregular shape. In such cases, it may be difficult to capture all of the document in one image. To capture all of the document, a camera may capture multiple images corresponding to different portions of the document. The multiple images can be combined based on an image stitching algorithm to produce a stitched image of the document. In some such cases, variations in orientation, size, and/or illumination between the multiple images can reduce accuracy of the stitched image.

Examples disclosed herein improve the technical field of image capture and, in part, enable a mobile device to capture images of a document at a constant orientation and/or distance relative to the document. In particular, the mobile device can be positioned on an example mobile device holder disclosed herein to reduce variations in the captured images. The example mobile device holder includes an example base and example side panels coupled to and foldable and/or otherwise pivotable relative to the base. The mobile device is to be positioned on the example base such that a camera of the mobile device is oriented downward toward the document. The example side panels are slidable along an example surface, and the side panels maintain a fixed distance between the mobile device and the surface. Advantageously, by maintaining the fixed distance between the mobile device and the surface, the example mobile device holder reduces variations in orientation, size, and/or illumination of the captured images. Stated differently, the example mobile device holder eliminates variability caused by manual human operation of image capturing behaviors that would otherwise cause erroneous data capture and/or poor image quality. Furthermore, the side panels are foldable toward the base such that the mobile device holder is portable when the mobile device holder is in a closed position (e.g., when the side panels are substantially parallel to and adjacent to the base).

In some examples, the mobile device holder includes a bottom panel coupled to at least one of the side panels, and at least one of the side panels or the bottom panel includes one or more reference markers. In such examples, the camera of the mobile device captures the one or more reference markers in the captured images. In examples disclosed herein, the captured images are provided to an example image processing controller, and the image processing controller detects the one or more reference markers in the captured images. In some examples, the image processing controller executes an image stitching algorithm to generate a stitched image based on the captured images, where the one or more reference markers are used as inputs to the image stitching algorithm. Advantageously, the one or more reference markers may improve accuracy of the image stitching algorithm.

FIG. 1 illustrates an example environment 100 for capturing and processing image data. In the example environment 100 of FIG. 1 includes an example mobile device 102 including an example camera 108. In this example, the example camera 108 of the mobile device 102 captures images and/or videos to be stored as image data in an example image database 110, where the image database 110 is implemented on the mobile device 102. The example image database 110 of the illustrated example of FIG. 1 is implemented by any memory, storage device and/or storage disc for storing data such as, for example, flash memory, magnetic media, optical media, etc. Furthermore, the data stored in the example image database 110 may be in any data format such as, for example, binary data, comma delimited data, tab delimited data, structured query language (SQL) structures, image data, etc.

In this example, the mobile device 102 implements an example image processing controller 112. In some examples, the image processing controller 112 processes the image data, such that the processed image data may be used for determining retail, market, and/or consumer information. While the image processing controller 112 is implemented by the mobile device 102 in this example, the image processing controller 112 can additionally or alternatively be implemented by a computing device communicatively coupled to the mobile device 102 via a network, in other examples. In some such examples, the image data can be processed on the mobile device 102, and the processed image data can be sent to the computing device for further processing and/or storage. In the illustrated example of FIG. 1, the example image processing controller 112 is implemented by a hardware logic circuit. However, any other type of circuitry may additionally or alternatively be used such as, for example, one or more analog or digital circuit(s), logic circuits, programmable processor(s), Application Specific Integrated Circuit(s) (ASIC(s)), Programmable Logic Device(s) (PLD(s)), Field Programmable Logic Device(s) (FPLD(s)), Digital Signal Processor(s) (DSP(s)), etc.

Figure 2:
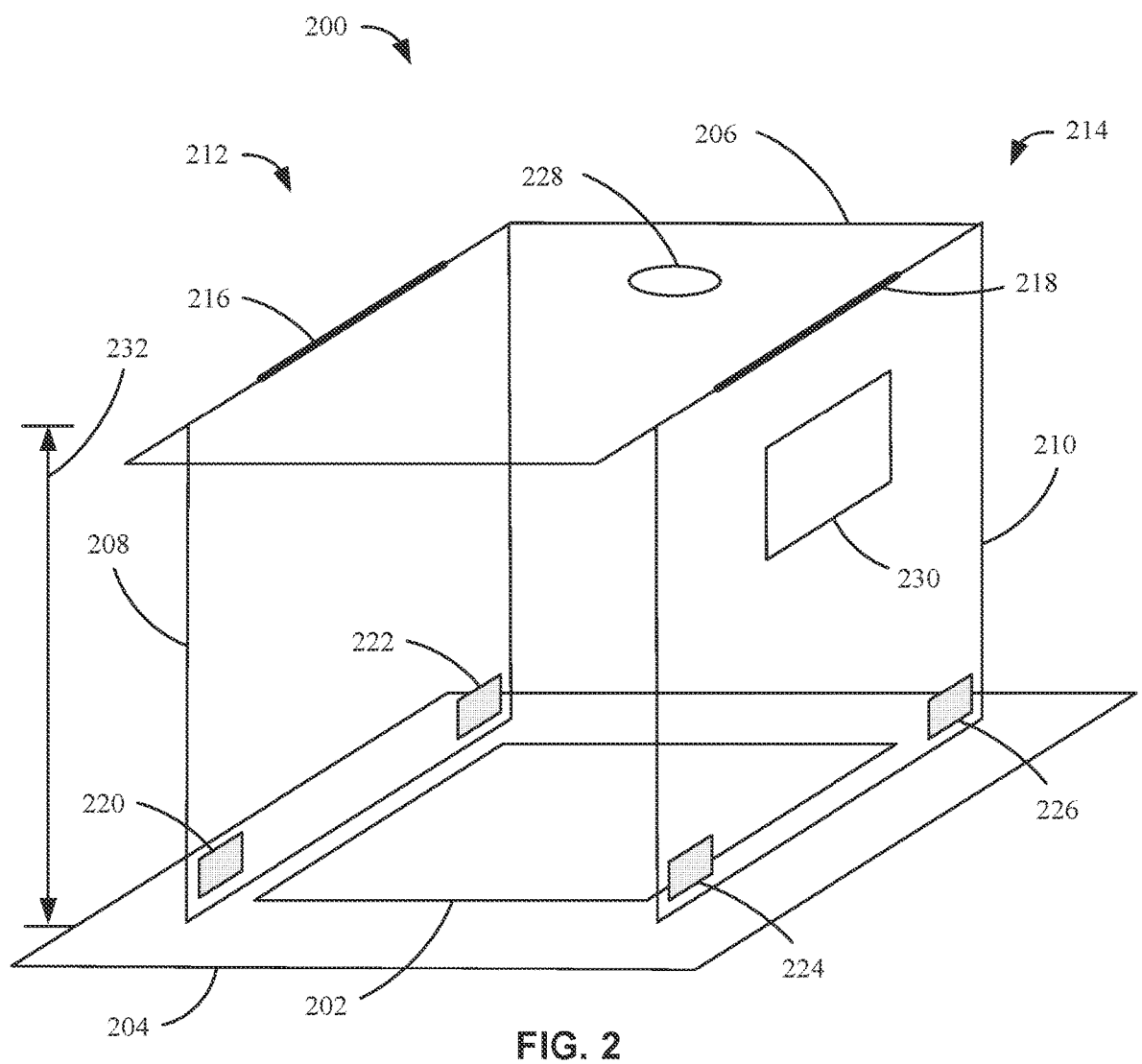
FIG. 2 illustrates an example mobile device holder constructed in accordance with the teachings of this disclosure.

FIG. 2 illustrates an example mobile device holder 200 in accordance with teachings of this disclosure. In the illustrated example of FIG. 2, the mobile device holder 200 is positioned above an example document (e.g., a target document) 202, and the mobile device 102 of FIG. 1 is to be placed on the mobile device holder 200 to capture one or more images of the document 202. In this example, the document 202 is placed on an example surface 204, where the surface 204 is substantially flat. In the illustrated example of FIG. 2, the mobile device holder 200 includes an example base 206 on which the mobile device 102 is to be placed. Example side panels 208, 210 are hingeably, pivotally, and/or rotatably coupled to the base 206 at corresponding left and right sides 212, 214 of the base 206. In this example, the mobile device holder 200 includes example hinges 216, 218 operatively coupled between the corresponding side panels 208, 210 and the base 206. Furthermore, the side panels 208, 210 include example markers (e.g., reference markers) 220, 222, 224, 226, and the base 206 includes an example opening 228. In this example, the second side panel 210 includes an example height indicator 230.

In the illustrated example of FIG. 2, the mobile device 102 is positioned on the base 206 such that the camera 108 of the mobile device 102 points downward toward the document 202. In some examples, the camera 108 is substantially aligned with the opening 228. In this example, the opening 228 is positioned centrally on the base 206 between the side panels 208, 210. In other examples, a position of the opening 228 may be different (e.g., proximate the left side 212 or the right side 214 of the mobile device holder 200). In some examples, the opening 228 is circular. In other examples, a different shape of the opening 228 can be used instead. In some examples, one or more additional openings can be disposed in the base 206. For example, at least one of the additional openings can be aligned with a light source of the mobile device 102 and/or one or more additional cameras of the mobile device 102.

In this example, the base 206 is rectangular and is a transparent plastic material. As such, in some examples, the base 206 does not include the opening 228. In other examples, the base 206 is opaque or at least partially transparent. In some examples, a different base may be used based on a type and/or model of the mobile device 102. For example, a size and/or shape of the base 206 can be selected based on the corresponding size and/or shape of the mobile device 102, and a size, shape, and/or position of the opening 228 can be selected based on the corresponding size, shape, and/or position of the camera 108.

In the illustrated example of FIG. 2, the side panels 208, 210 are slidable along the surface 204 such that the mobile device holder 200 can move and/or translate relative to the document 202. In this example, the side panels 208, 210 are constructed of the same transparent plastic material used for the base 206. In other examples, a different material can be used for the side panels 208, 210. For example, the side panels 208, 210 can be opaque or at least partially transparent. In this example, the side panels 208, 210 are foldable toward the base 206. In particular, the side panels 208, 210 are rotatable about the hinges 216, 218 between a first position (e.g., retracted position, closed position) and a second position (e.g., deployed position, open position). For example, when the side panels 208, 210 are in the first position, the side panels 208, 210 are substantially parallel to and/or adjacent the base 206. Conversely, in this example, the side panels 208, 210 are in the second position, where the side panels 208, 210 are substantially perpendicular to the base 206 and/or to the surface 204. The side panels 208, 210 in the second position maintain a distance (e.g., fixed distance) between the base 206 and the surface 204.

In the illustrated example of FIG. 2, the side panels 208, 210 have an example height 232, where the height 232 corresponds to the distance between the base 206 and the surface 204. In some examples, the side panels 208, 210 are removably coupled to the base 206 via the corresponding hinges 216, 218, and different side panels having a different height can be coupled to the base 206 instead. Accordingly, the distance between the base 206 and the surface 204 can be adjusted based on a selection of the side panels 208, 210 to be coupled to the base 206. In the illustrated example, the height indicator 230 of the second side panel 210 indicates the height 232 of the side panels 208, 210. For example, the height indicator 230 can include text, a barcode, and/or a numerical value corresponding to the height 232. Additionally or alternatively, the height indicator 230 can be implemented on the first side panel 208. While the height indicator 230 is positioned on the second side panel 210 closer to the base 206 in this example, the height indicator 230 may be positioned closer to the surface 204 in other examples. To reduce blockage of light through the second side panel 210, the height indicator 230 can be at least partially transparent and/or have a reduced size compared to the illustrated example. In some examples, the side panels 208, 210 include one or more slots and/or openings to permit ambient light to pass therethrough.

In some examples, increasing the distance between the base 206 and the surface 204 increases a field of view of the camera 108. Conversely, decreasing the distance between the base 206 and the surface 204 reduces the field of view of the camera 108. For example, the camera 108 may capture a first image corresponding to a first portion (e.g., all) of the document 202 when the mobile device 102 is at the height 232, and the camera 108 may capture a second image corresponding to a second portion of the document 202 when the mobile device 102 is at a reduced height (e.g., less than the height 232), where the second portion is smaller than the first portion. In some examples, the mobile device 102 at the reduced height can translate relative to the document 202 to capture multiple images corresponding to different portions of the document 202. In some such examples, the multiple images can be combined (e.g., stitched together) to produce the first image.

In this example, when the mobile device 102 is placed on the base 206, the mobile device 102 at least partially blocks and/or prevents light from passing through the base 206 to the document 202. In some examples, increasing the height 232 increases an amount of light that can pass through the side panels 208, 210 to illuminate the document 202, thus increasing clarity of the captured image. However, increasing the height 232 may reduce a resolution of the captured image and/or reduce detail in the captured image. As such, the height 232 of the side panels 208, 210 may be selected based on a desired clarity and/or resolution of the captured image.

In the illustrated example, the markers 220, 222, 224, 226 are positioned at bottom corners of the side panels 208, 210 proximate the surface 204. In this example, the markers 220, 222, 224, 226 are visible to the camera 108 of the mobile device 102 when the mobile device 102 is placed on the base 206. As such, the markers 220, 222, 224, 226 may be visible in the captured images processed by the image processing controller 112. In some examples, the image processing controller 112 detects the markers 220, 222, 224, 226 and controls stitching of the captured images based on the markers 220, 222, 224, 226. In this example, the markers 220, 222, 224, 226 are opaque and rectangular. In other examples, a different shape of the markers 220, 222, 224, 226 may be used instead.

Figure 3:
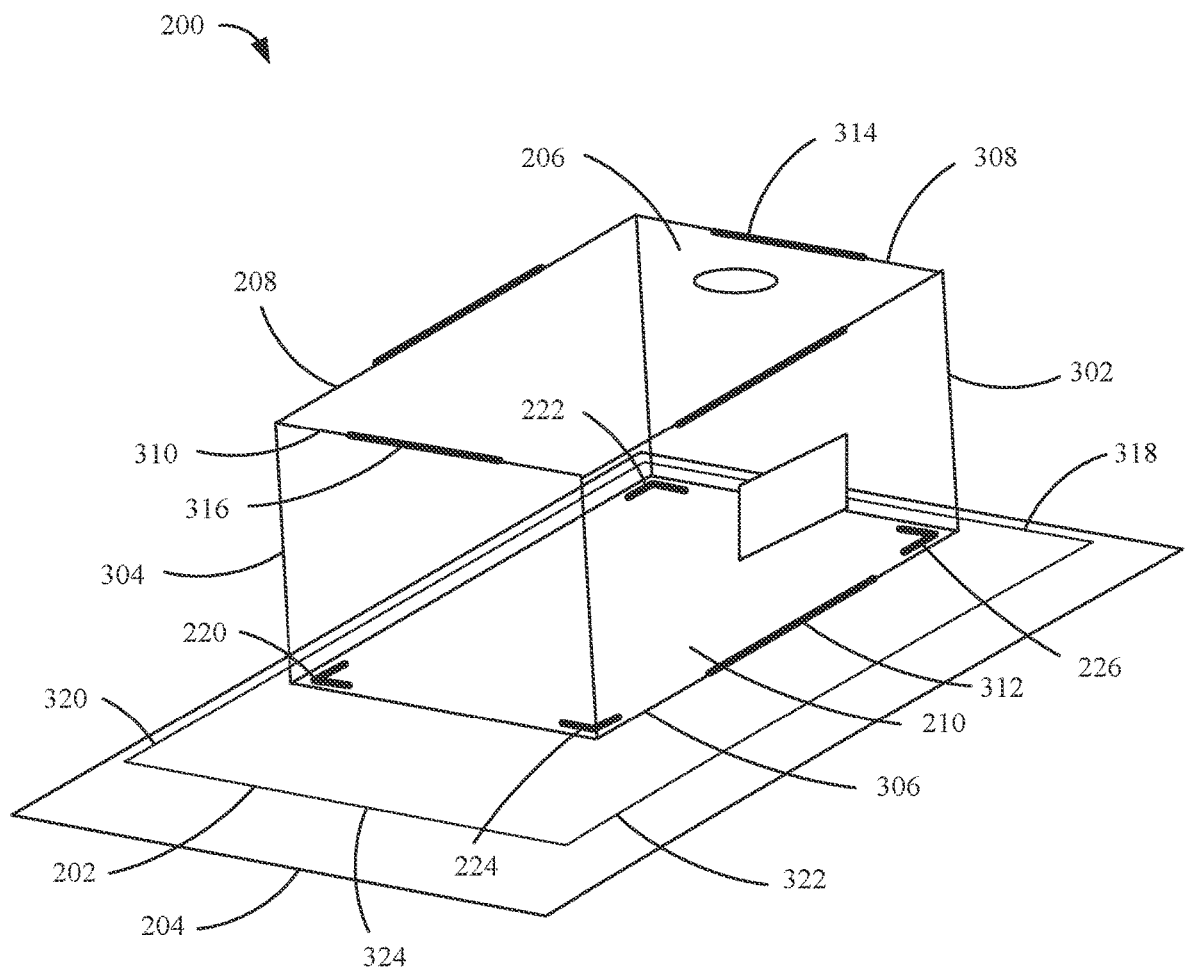
FIG. 3 illustrates the example mobile device holder of FIG. 2 including an example bottom panel.

FIG. 3 illustrates the example mobile device holder 200 of FIG. 2 including example third and fourth side panels 302, 304 and an example bottom panel (e.g., a transparent bottom panel) 306. In this example, the third and fourth side panels 302, 304 are hingeably and/or rotatably coupled to the base 206 at example front and rear edges 308, 310 of the base 206, respectively. In the illustrated example, the bottom panel 306 is hingeably and/or rotatably coupled to the second side panel 210 and is foldable toward the second side panel 210 via an example hinge 312. In other examples, the bottom panel 306 is hingeably and/or rotatably coupled to the first side panel 208, the third side panel 302, or the fourth side panel 304 instead. The bottom panel 306 is slidable along the surface 204 and/or the document 202. In this example, the third and fourth side panels 302, 304 are foldable toward the base 206 via corresponding hinges 314, 316.

In the illustrated example of FIG. 3, the bottom panel 306 enables flattening of the document 202 to be captured. For example, the document 202 may be wrinkled, which causes variations in distance between the base 206 and the document 202. In some examples, the bottom panel 306 flattens and/or reduces wrinkles in the document 202 such that the distance between the base 206 and the document 202 is generally constant across a surface of the document 202. Accordingly, by reducing wrinkles in the document 202, the bottom panel 306 improves image quality consistency of images captured by the mobile device 102 of FIG. 1.

In the illustrated example of FIG. 3, the markers 220, 222, 224, 226 are positioned on the bottom panel 306 instead of the side panels 208, 210. In this example, the bottom panel 306 is a transparent plastic material. Furthermore, the bottom panel 306 is rectangular, and the markers 220, 222, 224, 226 are positioned at corners of the bottom panel 306. In this example, the markers 220, 222, 224, 226 are V-shaped. In other examples, a different number, shape, and/or position of the markers 220, 222, 224, 226 may be used instead.

In the illustrated example, the document 202 is larger than the bottom panel 306. As such, when the mobile device 102 is placed on the mobile device holder 200, the camera 108 of the mobile device 102 captures a portion of the document 202 in an image. In some examples, the mobile device holder 200 can translate along the surface 204 relative to the document 202, and the mobile device 102 captures multiple images corresponding to multiple different portions of the document 202. In some examples, the mobile device 102 captures video data of the multiple portions. In particular, the mobile device holder 200 is placed at a starting position, where the starting position is at a top left corner of the document 202 adjacent an example top edge 318 and an example left edge 320 of the document 202. In such examples, a user of the mobile device 102 can move the mobile device holder 200 from the left edge 320 to an example right edge 322 of the document 202, and the mobile device 102 captures images and/or video data when moving between the left and right edges 320, 322. The user further moves the mobile device holder 200 downward toward an example bottom edge 324 of the document 202 and leftward to a position adjacent the left edge 320. The above process is repeated until the mobile device holder 200 reaches an end position at which the mobile device holder 200 is adjacent the right edge 322 and the bottom edge 324. In some examples, the image processing controller 112 of FIG. 1 obtains the images and/or the video data captured by the mobile device 102, and the image processing controller 112 generates a stitched image of the document 202 based on the obtained images and/or video data.

In some examples, the base 206 provides means for holding the mobile device 102. In some examples, the side panels 208, 210 provide means for supporting to maintain a first distance between the base 206 and the document 202. In some examples, the height indicator 230 provides means for indicating the height 232 of the side panels 208, 210. In some examples, the bottom panel 306 provides means for sliding along the surface 204.

Figure 4:
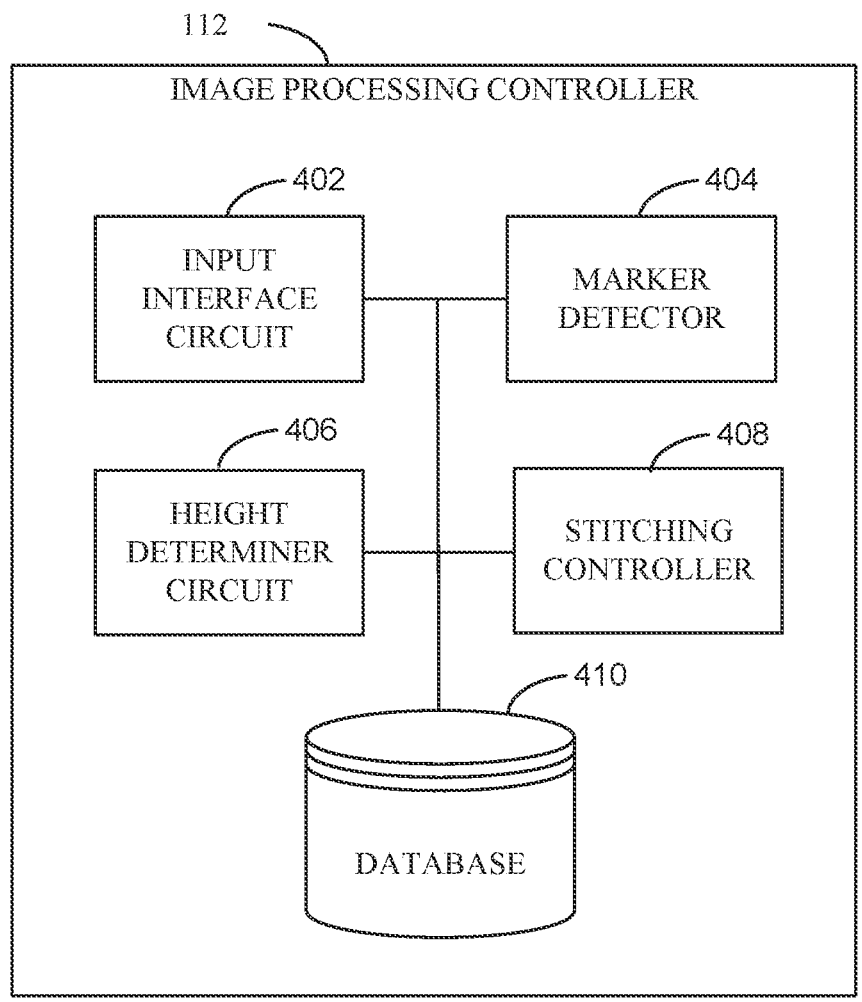
FIG. 4 is a block diagram of the example image processing controller of the example environment of FIG. 1.

FIG. 4 is a block diagram of the example image processing controller 112 of the example environment 100 of FIG. 1. The image processing controller 112 is structured to process images and/or video data captured by the camera 108 of the mobile device 102 of FIG. 1. In the illustrated example of FIG. 4, the example image processing controller 112 includes an example input interface circuit 402, an example marker detector 404, an example height determiner circuit 406, an example stitching controller 408, and an example database 410.

The example input interface circuit 402 receives image data and/or video data from the camera 108 of the mobile device 102. In some examples, the input interface circuit 402 receives one or more inputs from a user of the mobile device 102. For example, the user may input a value of the height 232 of FIG. 2 into the mobile device 102, and the mobile device 102 sends the value of the height 232 to the image processing controller 112.

The example marker detector 404 detects the markers 220, 222, 224, 226 in the image data and/or video data. For example, the marker detector 404 determines relative locations of the markers 220, 222, 224, 226 between images of the image data and/or frames of the video data. In some examples, the marker detector 404 detects the height 232 of FIG. 2 in the image data and/or video data.

The example height determiner circuit 406 determines the height 232 of the mobile device 102 on the mobile device holder 200. In some examples, the height determiner circuit 406 determines the height 232 based on the height indicator 230 detected by the marker detector 404. For example, the height determiner circuit 406 can determine the height 232 based on a color, size, and/or text associated with the height indicator 230. In other examples, the height determiner circuit 406 determines the height 232 based on a size of the markers 220, 222, 224, 226 and/or distances between the markers 220, 222, 224, 226 detected by the height determiner circuit 406. In some examples, the height determiner circuit 406 determines the height 232 based on the value input by the user of the mobile device 102.

The example stitching controller 408 stitches one or more images from the image data and/or one or more frames from the video data to generate a stitched image corresponding to the document 202 of FIGS. 2 and/or 3. For example, the stitching controller 408 combines the one or more images and/or the one or more frames based on the markers 220, 222, 224, 226 detected by the marker detector 404. In some examples, the stitching controller 408 executes an image stitching algorithm to produce the stitched image. In some such examples, relative locations of the markers 220, 222, 224, 226 between the one or more images and/or one or more frames are used as inputs to the image stitching algorithm.

In some examples, the stitching controller 408 stores the stitched image in the database 410. In some examples, the stitching controller 408 analyzes the image data and/or the video data to detect words and/or images that are incomplete and/or cut-off. In such examples, the stitching controller 408 determines that one or more portions of the document 202 have not been captured in response to detecting the words and/or images that are incomplete and/or cut-off. In some such examples, the stitching controller 408 directs the mobile device 102 to display an indication (e.g., to a user of the mobile device 102) when one or more portions of the document 202 have not been captured.

For instance, in response to the stitching controller 408 detecting incomplete text, the example stitching controller 408 causes a display of the mobile device 102 to render a visual and/or audio prompt with movement instructions. In some examples, the stitching controller 408 renders a graphic of an arrow pointing in a direction of movement that the mobile device holder 200 should be moved in an effort to capture portions of the example document 202 that have not yet been captured. Stated differently, in the event the example stitching controller 408 detects images and/or text that is cut-off on a right hand side of a capture region of the document 202, the stitching controller 408 causes an arrow graphic to be rendered on the display of the mobile device 102, in which the arrow graphic is oriented in a right-sided direction. In still further examples, the stitching controller 408 renders a graphic of a stop sign when a threshold amount of new area of the example document 202 is within an aperture range of the example camera 108.

In the illustrated example of FIG. 4, the example input interface circuit 402, the example marker detector 404, the example height determiner circuit 406, and/or the example stitching controller 408 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

The database 410 stores the image data and/or the video data received by the input interface circuit 402. In some examples, the database 410 stores one or more stitched images generated by the stitching controller 408. The example database 410 of the illustrated example of FIG. 4 is implemented by any memory, storage device and/or storage disc for storing data such as, for example, flash memory, magnetic media, optical media, etc. Furthermore, the data stored in the example database 410 may be in any data format such as, for example, binary data, comma delimited data, tab delimited data, structured query language (SQL) structures, image data, etc.

In some examples, the image processing controller 112 provides means for processing images. In some examples, the input interface circuit 402 provides means for receiving image data and/or video data from the camera 108 of the mobile device 102. In some examples, the marker detector 404 provides means for detecting the markers 220, 222, 224, 226. In some examples, the height determiner circuit 406 provides means for determining the height 232 of the side panels 208, 210. In some examples, the stitching controller 408 provides means for stitching images.

While an example manner of implementing the image processing controller 112 of FIG. 1 is illustrated in FIG. 4, one or more of the elements, processes and/or devices illustrated in FIG. 4 may be combined, divided, re-arranged, omitted, eliminated and/or implemented in any other way. Further, the example input interface circuit 402, the example marker detector 404, the example height determiner circuit 406, the example stitching controller 408, the example database 410 and/or, more generally, the example image processing controller 112 of FIG. 4 may be implemented by hardware, software, firmware and/or any combination of hardware, software and/or firmware. Thus, for example, any of the example input interface circuit 402, the example marker detector 404, the example height determiner circuit 406, the example stitching controller 408, the example database 410 and/or, more generally, the example image processing controller 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example input interface circuit 402, the example marker detector 404, the example height determiner circuit 406, the example stitching controller 408, and/or the example database 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image processing controller 112 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
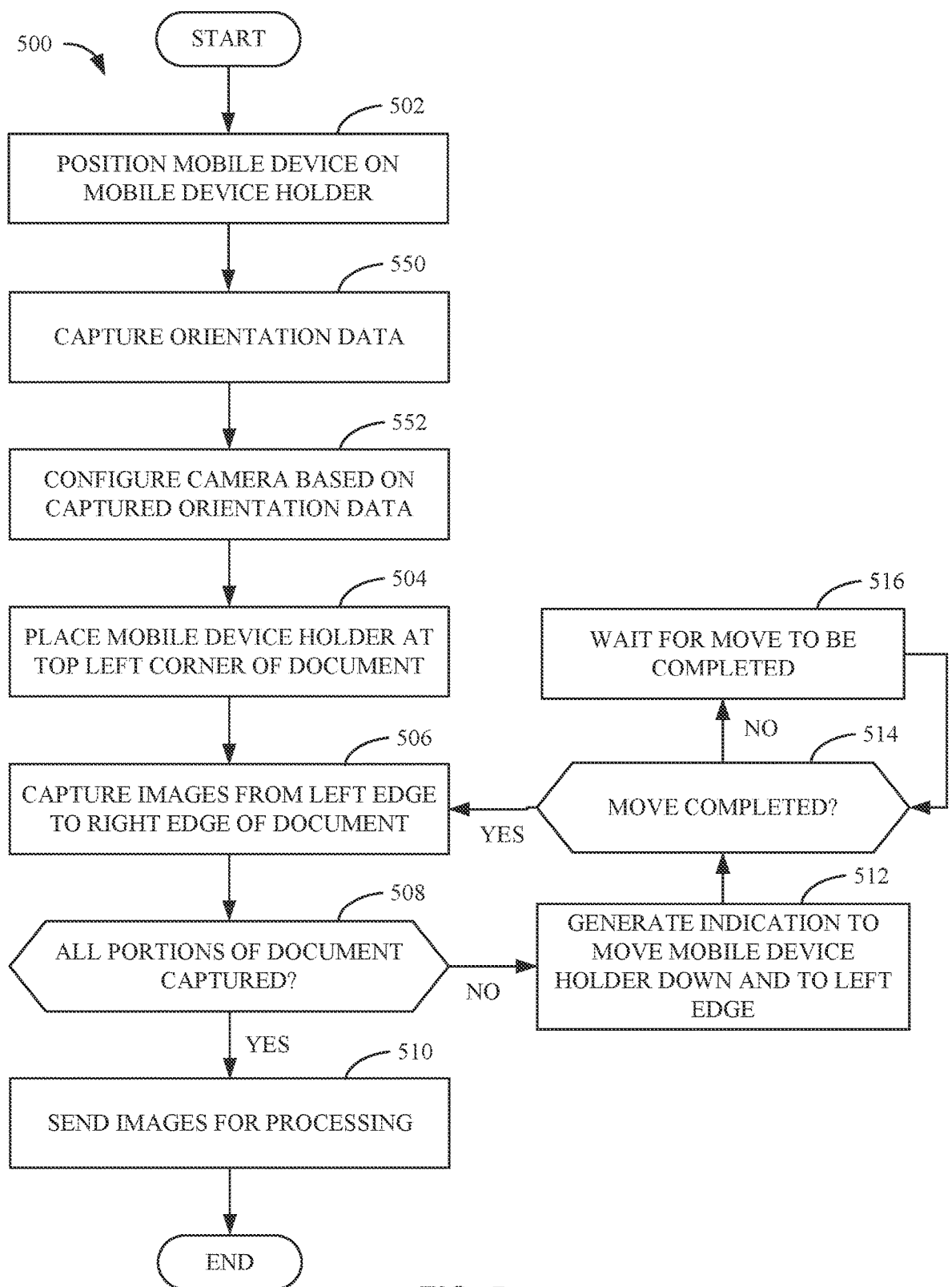
FIG. 5 is a flowchart representative of an example method to capture image data using the example mobile device holder of FIGS. 2 and/or 3.
Figure 6:
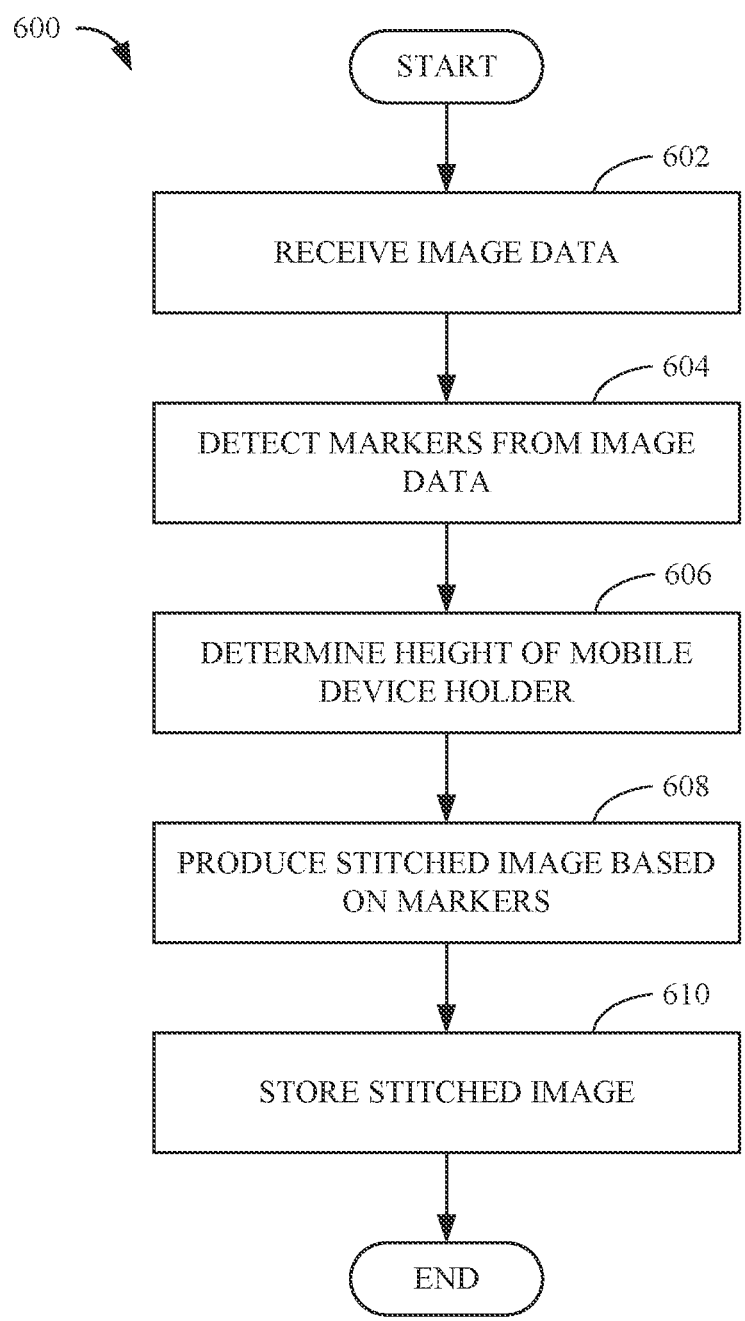
FIG. 6 is a flowchart representative of machine readable instructions which may be executed to implement the example image processing controller of FIG. 4 to generate a stitched image based on captured image data.

Flowcharts representative of example hardware logic, machine readable instructions, hardware implemented state machines, and/or any combination thereof for implementing the image processing controller 112 of FIG. 4 are shown in FIGS. 5 and 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and/or 6, many other methods of implementing the example image processing controller 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of an example method 500 to capture image data using the mobile device 102 of FIG. 1 and the example mobile device holder 200 of FIGS. 2 and/or 3. For example, the example method 500 can be implemented to capture the image data corresponding to the document 202 of FIGS. 2 and/or 3. The example method 500 begins at block 502, at which the mobile device 102 is positioned on the mobile device holder 200. For example, a user of the mobile device 102 places the mobile device 102 on the base 206 of FIGS. 2 and/or 3 such that the camera 108 of FIG. 1 is oriented downward toward the document 202. In some examples, the mobile device 102 is positioned such that the camera 108 is substantially aligned with the opening 228 of FIG. 2.

In some examples where the image processing controller 112 is a component of and/or otherwise operating on the example mobile device 102, an app corresponding to the example processing controller 112 is activated prior to the mobile device 102 being placed on the example mobile device holder 200. In such circumstances, the image processing controller 112 detects a substantially horizontal orientation of the mobile device 102 by, for example, invoking one or more sensors of the mobile device 102 (e.g., a gyroscope, a compass, etc.) (block 502). In some examples the image processing controller 112 causes a graphical user interface (GUI) to be displayed on a screen/display of the mobile device 102 having one or more buttons, such as a button that indicates "Is the phone placed on the mobile device holder?"

In response to the example image processing controller 112 obtaining an indication that the button has been selected and/or otherwise activated (e.g., by a user), the example height determiner circuit 406 captures available orientation data (block 550). As disclosed above, the height determiner circuit 406 scans and/or otherwise evaluates a captured image to identify an indication of a height of the example mobile device holder 200 based on an available height indicator 230 (e.g., a barcode). In some examples, the marker detector 404 determines a starting orientation of the mobile device holder 200 based on detection of one or more markers 220, 222, 224 and/or 226. The example image processing controller 112 uses the orientation data to configure the camera 108 of the mobile device 102 in an effort to optimize one or more camera settings in a manner that improves image quality of one or more captured images of the document 202 (block 552).

In some examples, an initial starting position of the mobile device holder 200 is a top left corner of the document 202 (block 504). For example, in response to a GUI prompt caused by the image processing controller 112, the user positions the mobile device holder 200 adjacent the top edge 318 and the left edge 320 of the document 202 of FIG. 3.

At block 506, the mobile device 102 captures images from the left edge 320 to the right edge 322 of the document 202. For example, the user slides the mobile device holder 200 from the left edge 320 to the right edge 322, and the mobile device 102 captures the images when sliding between the left and right edges 320, 322. In some examples, the image processing controller 112 generates and/or otherwise causes a GUI to render movement instructions on a display of the mobile device 102.

At block 508, the user determines whether all portions of the document 202 have been captured in the images. For example, in response to the user determining that one or more portions of the document 202 have not been captured (e.g., block 508 returns a result of NO), the process proceeds to block 512. Alternatively, in response to the user or the example image processing controller 112 determining that all portions of the document 202 have been captured (e.g., block 508 returns a result of YES), the process proceeds to block 512.

At block 512, the example image processing controller 112 causes a GUI prompt to be generated, rendered, and/or otherwise displayed on a display of the mobile device 102 to request that the mobile device holder 200 is moved downward and to the left edge 320 of the document 202. For example, the user slides the mobile device holder 200 downward toward the bottom edge 324 of the document 202 and to a position adjacent the left edge 320. In response to the image processing controller 112 determining that the move is not yet complete (block 514), the process waits (block 516). In some examples, the input interface circuit 402 monitors one or more sensors of the mobile phone 102

(e.g., an accelerometer, a gyroscope, etc.) to verify that the mobile device 102 has not moved for a threshold period of time (e.g., one or more seconds) (block 516), which is an indication that the move has been completed (block 514). Control then returns to block 506.

In response to the image processing controller 112 determining that all portions of the document 202 have been captured (block 508), the mobile device 102 sends the images for processing. For example, the mobile device 102 sends the images to one or more market research entities and/or image recognition servers communicatively coupled to the mobile device 102 via a network (block 510).

FIG. 6 is a flowchart representative of machine readable instructions 600 which may be executed to implement the example image processing controller 112 of FIG. 4 to generate a stitched image based on captured image data. The example instructions 600 begin at block 602, at which the example image processing controller 112 receives image data. For example, the example input interface circuit 402 of FIG. 4 receives images from the camera 108 of the mobile device 102 of FIG. 1. In some examples, the images correspond to the document 202 of FIGS. 2 and/or 3, and the images are captured by the camera 108 of the mobile device 102 based on the method 500 described in connection with FIG. 5 above.

At block 604, the example image processing controller 112 detects the markers 220, 222, 224, 226 from the image data. For example, the example marker detector 404 of FIG. 4 detects the markers 220, 222, 224, 226 in the captured images received at the input interface circuit 402. In some examples, the example marker detector 404 detects the height indicator 230 of FIG. 2 in the captured images.

At block 606, the example image processing controller 112 determines the height 232 of the mobile device holder 200 of FIGS. 2 and/or 3. For example, the example height determiner circuit 406 of FIG. 4 determines the height 232 based on the height indicator 230 detected by the example marker detector 404. In some examples, the example height determiner circuit 406 determines the height 232 based on a size of and/or distance between the markers 220, 222, 224, 226, and/or based on a value of the height 232 input by a user of the mobile device 102.

At block 608, the example image processing controller 112 produces a stitched image based on the markers 220, 222, 224, 226. For example, the example stitching controller 408 of FIG. 4 combines one or more of the captured images using an image stitching algorithm, where relative locations of the markers 220, 222, 224, 226 are used as an input to the image stitching algorithm. In response to executing the image stitching algorithm, the example stitching controller 408 generates the stitched image corresponding to the document 202.

At block 610, the example image processing controller 112 stores the stitched image. For example, the example database 410 of FIG. 4 stores the stitched image and/or the captured images. The process ends.

Figure 7:
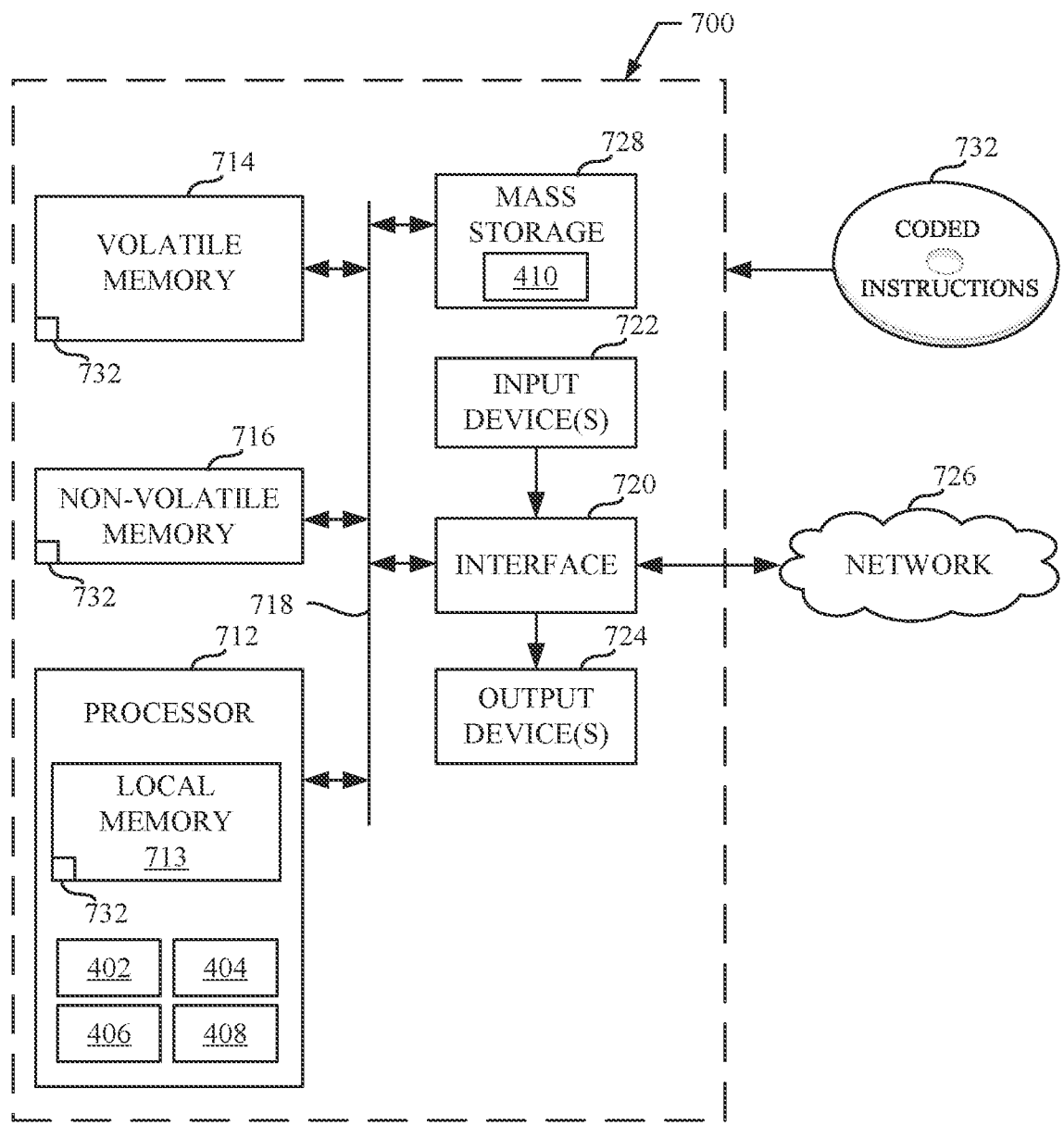
FIG. 7 is a block diagram of an example processing platform structured to execute the instructions of FIGS. 5 and 6 to implement the example image processing controller of FIG. 4.

FIG. 7 is a block diagram of an example processor platform 700 structured to execute the instructions of FIG. 6 to implement the image processing controller 112 of FIG. 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the input interface circuit 402, the marker detector 404, the height determiner circuit 406, the stitching controller 408, and the database 410.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed for capturing image data and/or video data corresponding to a document. The disclosed methods, apparatus and articles of manufacture enable a mobile device to capture images at a substantially constant height and/or orientation relative to the document. The disclosed methods, apparatus and articles of manufacture improve the efficiency of using a computing device by reducing variations associated with orientation, warping, and/or illumination of the captured images, thus enabling the computing device to more accurately determine retail, consumer, and/or market information based on the captured images. Examples disclosed herein also improve computing device efficiency by reducing and/or otherwise minimizing the need to re-take images that would otherwise be blurry and unusable due to human variations in image capture behavior. The disclosed methods, apparatus and articles of manufacture are accordingly directed to one or more improvement(s) in the functioning of a computer.

Example 1 includes an apparatus including a base structured to position a mobile device, the base including an opening corresponding to a camera of the mobile device, and at least two side panels couplable to and foldable toward the base, the side panels to maintain a first distance between the base and a target document, the side panels slidable along the target document.

Example 2 includes the apparatus of Example 1, where at least one of the base or the side panels are a transparent plastic material.

Example 3 includes the apparatus of Example 1, and further includes a transparent bottom panel proximate a surface upon which the target document is positioned, the transparent bottom panel coupled to at least one of the side panels, the transparent bottom panel slidable along the surface.

Example 4 includes the apparatus of Example 1, where the side panels include one or more reference markers.

Example 5 includes the apparatus of Example 4, where the side panels are rectangular, and wherein the reference markers are positioned at bottom corners of the side panels, the bottom corners proximate to the target document.

Example 6 includes the apparatus of Example 1, where the side panels are rotatable between a first position and a second position, the side panels substantially parallel to the base in the first position, the side panels substantially perpendicular to the base in the second position.

Example 7 includes the apparatus of Example 1, where at least one of the side panels includes a height indicator to indicate a height of the side panels.

Example 8 includes the apparatus of Example 1, where the side panels are first side panels having a first height, and further includes second side panels having a second height, the second height different from the first height, the first side panels or the second side panels to be coupled to the base.

Example 9 includes an apparatus including at least two side panels couplable to and foldable toward a base, the base structured to position a mobile device above a target document, the side panels to maintain a first distance between the base and the target document, and a transparent bottom panel coupled to at least one of the side panels, the transparent bottom panel slidable along the target document.

Example 10 includes the apparatus of Example 9, and further includes reference markers positioned at corners of the transparent bottom panel.

Example 11 includes the apparatus of Example 9, where at least one of the base or the side panels are a transparent plastic material.

Example 12 includes the apparatus of Example 9, where the base includes an opening, the opening aligned with a position of a camera of the mobile device.

Example 13 includes the apparatus of Example 9, where the side panels are rotatable between a first position and a second position, the side panels substantially parallel to the base in the first position, the side panels substantially perpendicular to the base in the second position.

Example 14 includes the apparatus of Example 9, where at least one of the side panels includes a height indicator to indicate a height of the side panels.

Example 15 includes the apparatus of Example 9, where the side panels are first side panels having a first height, and further includes second side panels having a second height, the second height different from the first height, the first side panels or the second side panels to be coupled to the base.

Example 16 includes an apparatus including means for holding a mobile device, the holding means including an opening corresponding to a camera of the mobile device, and means for supporting to maintain a first distance between the holding means and a target document, the supporting means pivotably coupled to the supporting means.

Example 17 includes the apparatus of Example 16, where at least one of the holding means or the supporting means are a transparent plastic material.

Example 18 includes the apparatus of Example 16, where at least one of the supporting means includes means for indicating height, the height indicating means to indicate a height of the supporting means.

Example 19 includes the apparatus of Example 16, and further includes means for sliding coupled to at least one of the supporting means, the sliding means proximate a surface upon which the target document is positioned, the sliding means slidable along the surface.

Example 20 includes the apparatus of Example 19, where reference markers are positioned at corners of the sliding means.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An apparatus comprising:
a base structured to position a mobile device, the base including an opening corresponding to a camera of the mobile device; and
at least two rectangular side panels couplable to and foldable toward the base, the side panels structured to maintain a first distance between the base and a target document, the side panels slidable along the target document, the side panels to include one or more reference markers positioned at bottom corners of the side panels, the bottom corners proximate to the target document.

2. The apparatus of claim 1, wherein at least one of the base or the side panels are a transparent plastic material.

3. The apparatus of claim 1, further including a transparent bottom panel proximate a surface upon which the target document is positioned, the transparent bottom panel coupled to at least one of the side panels, the transparent bottom panel slidable along the surface.

4. The apparatus of claim 1, wherein the side panels are rotatable between a first position and a second position, the side panels substantially parallel to the base in the first position, the side panels substantially perpendicular to the base in the second position.

5. The apparatus of claim 1, wherein at least one of the side panels includes a height indicator to indicate a height of the side panels.

6. The apparatus of claim 5, wherein the height indicator includes at least one of text, a barcode, or a numerical value.

7. The apparatus of claim 1, wherein the side panels are first side panels having a first height, further including second side panels having a second height, the second height different from the first height, the first side panels or the second side panels structured to be coupled to the base.

8. The apparatus of claim 1, wherein the side panels are removably coupled to the base.

9. The apparatus of claim 1, wherein the one or more reference markers are structured to be detectable by an image processor to facilitate image stitching.

10. An apparatus comprising:
at least two side panels couplable to and foldable toward a base, the base structured to position a mobile device above a target document, the side panels structured to maintain a first distance between the base and the target document;
a transparent bottom panel coupled to at least one of the side panels, the transparent bottom panel slidable along the target document; and
reference markers positioned at corners of the transparent bottom panel.

11. The apparatus of claim 10, wherein at least one of the base or the side panels are a transparent plastic material.

12. The apparatus of claim 10, wherein the base includes an opening, the opening aligned with a position of a camera of the mobile device.

13. The apparatus of claim 10, wherein the side panels are rotatable between a first position and a second position, the side panels substantially parallel to the base in the first position, the side panels substantially perpendicular to the base in the second position.

14. The apparatus of claim 10, wherein at least one of the side panels includes a height indicator to indicate a height of the side panels.

15. The apparatus of claim 10, wherein the side panels are first side panels having a first height, further including second side panels having a second height, the second height different from the first height, the first side panels or the second side panels to be coupled to the base.

16. The apparatus of claim 10, wherein the height indicator includes at least one of text, a barcode, or a numerical value.

17. An apparatus comprising:
means for holding a mobile device, the holding means including an opening corresponding to a camera of the mobile device;
means for supporting to maintain a first distance between the holding means and a target document, the supporting means pivotably coupled to the holding means, the supporting means including reference markers positioned to be in a field of view of the camera, the reference markers being detectable by means for stitching images;
and wherein at least one of the holding means or the supporting means is formed of a transparent plastic material.

18. The apparatus of claim 17, wherein at least one of the supporting means includes means for indicating height, the height indicating means to indicate a height of the supporting means.

19. The apparatus of claim 17, further including means for sliding coupled to at least one of the supporting means, the sliding means proximate a surface upon which the target document is positioned, the sliding means slidable along the surface.

20. The apparatus of claim 19, wherein the reference markers are positioned at corners of at least one the sliding means or the supporting means.

* * * * *